US008793407B2

(12) United States Patent
Jeon et al.

(10) Patent No.: US 8,793,407 B2
(45) Date of Patent: Jul. 29, 2014

(54) DISPLAY APPARATUS USING EXTERNAL DEVICE CONNECTION UNIT AND METHOD OF DETERMINING FORMAT OF INPUT IMAGE THEREOF

(75) Inventors: Keun-bae Jeon, Suwon-si (KR); Nae-won Jang, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 153 days.

(21) Appl. No.: 12/625,866

(22) Filed: Nov. 25, 2009

(65) Prior Publication Data

US 2010/0128179 A1 May 27, 2010

(30) Foreign Application Priority Data

Nov. 26, 2008 (KR) ................................ 2008-118120
Nov. 11, 2009 (KR) ................................ 2009-108643

(51) Int. Cl.
*H04N 5/64* (2006.01)

(52) U.S. Cl.
USPC ............... 710/16; 348/839; 348/554; 345/60; 345/205

(58) Field of Classification Search
USPC ............. 348/705, 554, 839; 439/581; 345/60, 345/205
See application file for complete search history.

(56) References Cited

U.S. PATENT DOCUMENTS

| | | | | |
|---|---|---|---|---|
| 6,829,779 | B1 * | 12/2004 | Perlman | 725/37 |
| 7,690,930 | B2 * | 4/2010 | Chen et al. | 439/76.1 |
| 7,728,911 | B2 * | 6/2010 | Lacy et al. | 348/706 |
| 8,095,713 | B2 * | 1/2012 | Minoo et al. | 710/104 |
| 2004/0257305 | A1 * | 12/2004 | Liao et al. | 345/60 |
| 2005/0160471 | A1 * | 7/2005 | Cohen | 725/116 |
| 2008/0062328 | A1 * | 3/2008 | Bilbrey | 348/705 |
| 2008/0068517 | A1 * | 3/2008 | Urisu | 348/790 |
| 2008/0074411 | A1 * | 3/2008 | Yamashita | 345/211 |
| 2008/0303794 | A1 * | 12/2008 | Bolt et al. | 345/173 |
| 2009/0051820 | A1 * | 2/2009 | Oikawa | 348/705 |
| 2009/0051824 | A1 * | 2/2009 | Satou | 348/734 |
| 2009/0109335 | A1 * | 4/2009 | Choi et al. | 348/554 |
| 2009/0201420 | A1 * | 8/2009 | Brown et al. | 348/552 |
| 2010/0013998 | A1 * | 1/2010 | Mortensen | 348/558 |

FOREIGN PATENT DOCUMENTS

| | | |
|---|---|---|
| JP | 2007-241261 | 9/2007 |
| KR | 2004-13408 | 2/2004 |

OTHER PUBLICATIONS

Talla, Using DaVinci Technology for Digital Video Devices, Oct. 2007, Taxes Instruments, 1-9.*

* cited by examiner

*Primary Examiner* — Ernest Unelus
(74) *Attorney, Agent, or Firm* — Stanzione & Kim, LLP

(57) ABSTRACT

A display apparatus connected to an external device through a connection unit and a method of determining the format of an input image uses a connection unit to be connected to an external device and determines the format of a video signal input through the connection unit. Accordingly, it is possible to realize a slim display apparatus.

41 Claims, 7 Drawing Sheets

DISPLAY APPARATUS USING EXTERNAL DEVICE CONNECTION UNIT AND METHOD OF DETERMINING FORMAT OF INPUT IMAGE THEREOF

CROSS-REFERENCE TO RELATED APPLICATIONS

This application claims priority under 35 U.S.C. §119 (a) from Korean Patent Application Nos. 10-2008-118120 and 10-2009-108643, filed on Nov. 26, 2008 and Nov. 11, 2009, respectively, in the Korean Intellectual Property Office, the disclosures of which are incorporated herein by reference in their entirety.

BACKGROUND

1. Field of the Invention

The present general inventive concept relates to a display apparatus using an external device connection unit and a method of determining the format of an input image thereof, and more particularly, to a display apparatus which uses an extra external device connection unit to slim its size and a method of determining the format of an input image thereof.

2. Description of the Related Art

In general, a display apparatus receives video and audio signals from an external device such as a set-top box, a DVD player, and a PC and outputs an image and a sound. Such a display apparatus is equipped with a connection part to receive video and audio signals from an external device. The connection part includes a plurality of input terminals to which a cable is connected to connect the display apparatus and the external device. The plurality of input terminals occupies a large space, so they are not suitable for the slim display apparatus. That is, the volume of the input terminals makes it difficult to slim the display apparatus.

SUMMARY

The present general inventive concept provides a display apparatus which has a separate external device connection unit to slim its size and a method of determining the format of an input image thereof.

Additional features and/or utilities of the present general inventive concept will be set forth in part in the description which follows and, in part, will be obvious from the description, or may be learned by practice of the general inventive concept.

Exemplary embodiments of the present general inventive concept may be achieved by providing a display apparatus including at least one connection terminal to which at least one connection unit is connectible individually, a controller to determine types of input signals which are input from an external device through the at least one connection unit and the at least one connection terminal, the external device being connected to the at least one connection unit connected to the at least one connection terminals, and a signal processing unit to process the input signals in a method corresponding to the determined types.

Each of the at least one connection terminal may be connectible to each of the at least one connection unit.

Each of the at least one connection terminal may be individually connected to the controller through a first determination pin and a second determination pin, and the first and the second determination pins may be connected to a first pull-up resistor and a second pull-up resistor respectively.

With respect to a connection terminal in which a voltage detected through one of the first and the second determination pins is a half of a pull-up voltage, the controller may determine that an RGB digital video signal is input.

With respect to a connection terminal in which a voltage detected through one of the first and the second determination pins is low and a voltage detected through the other determination pin is high, the controller may determine that a composite video signal is input.

With respect to a connection terminal in which a voltage detected through both the first and the second determination pins is low, the controller may determine that a component video signal is input.

With respect to a connection terminal in which a voltage detected through both of the first and the second determination pins is high, the controller may determine that no video signal is input.

The plurality of connection units may include at least one terminal of a D_SUB terminal and a RCA terminal.

The first determination pin may be connected to a pin into which a brightness signal included in a component signal and a composite signal are input, and the second determination pin may be connected to one of a pin into which a color difference signal included in a component signal is input and a predetermined pin of a D_SUB terminal.

If there is more than one at least one connection terminal, each of the at least one connection terminal may have the same shape.

The controller may determine a type of at least one input signal which is input from the external device, which is connected to the at least one connection unit connected to the at least one connection terminal, through the at least one connection unit and the at least one connection terminal, and the signal processing unit may process the at least one input signal in a method corresponding to the determined type.

The at least one connection terminal may be connected to the controller through a single determination pin.

The controller may determine the type of the at least one input signal using a voltage detected at the determination pin.

The at least one input signal may include at least one of a component signal, a composite signal, and an S-video signal.

The at least one connection terminal may receive only a video signal which is set for each of the connection terminal.

Exemplary embodiments of the present general inventive concept may also be achieved by providing a method of determining types of an input signal of a display apparatus including at least one connection terminal to which at least one connection unit is connectible individually, the method including determining types of input signals which are input from an external device through the connection unit and the connection terminal, the external device being connected to the connection unit connected to the at least one connection terminal, and processing the input signals in a method corresponding to the determined types.

Each of the at least one connection terminal may be connectible to each of the at least one connection unit.

The determining may further include detecting voltage through pull-up resistors connected to a first determination pin and a second determination pin which are included in each of the at least one connection terminal and determining the types of input signals.

With respect to a connection terminal in which a voltage detected through one of the first and the second determination pins is a half of a pull-up voltage, the determining may further include determining that a RGB digital video signal is input.

With respect to a connection terminal in which a voltage detected through one of the first and the second determination pins is low and a voltage detected through the other determination pin is high, the determining may further include determining that a composite video signal is input.

With respect to a connection terminal in which a voltage detected through both the first and the second determination pins is low, the determining may further include determining that a component video signal is input.

With respect to a connection terminal in which a voltage detected through both of the first and the second determination pins is high, the determining may further include determining that no video signal is input.

The at least one connection unit may further include at least one terminal of a D_SUB terminal and a RCA terminal.

The first determination pin may be connected to a pin into which a brightness signal included in a component signal and a composite signal are input, and the second determination pin may be connected to one of a pin into which a color difference signal included in a component signal is input and a predetermined pin of a D_SUB terminal.

If there is more than one at least one connection terminal, each of the at least one connection terminal may have the same shape.

The determining may further include determining a type of at least one input signal which is input from the external device, which is connected to the at least one connection unit connected to the at least one connection terminal, through the at least one connection unit and the at least one connection terminal, and the processing may include processing the at least one input signal in a method corresponding to the determined type.

The at least one connection terminal may be connected to a controller through a single determination pin.

The determining may further include determining the type of the at least one input signal using a voltage detected at the determination pin.

The at least one input signal may further include at least one of a component signal, a composite signal, and an S-video signal.

The at least one connection terminal may receive only a video signal which is set for each of the connection terminal.

Exemplary embodiments of the present general inventive concept may also be achieved by providing a display apparatus, including a connection unit having at least one connection terminal to receive an input signal from an external device, and a controller connected to the connection unit to determine a type of the input signal according to a level of the input signal and to process the input signal according to the determined type.

The at least one connection terminal may be connected to a determination pin, and the controller may determine the type of the input signal according to a signal from the determination pin.

The determination pin may be connected to at least one pull-up resistor, and the controller may determine the type of the input signal according to a detected voltage from the at least one pull-up resistor.

Exemplary embodiments of the present general inventive concept may also be achieved by providing a method of determining a type of an input signal in a display apparatus including a connection unit having at least one connection terminal to receive an input signal from an external device, the method including receiving an input signal from the external device, determining the type of the input signal according to the received input signal, and processing the input signal according to the determined type.

The at least one connection terminal may be connected to a determination pin, and the method may further include determining the type of the input signal according to a signal from the determination pin.

The determination pin may be connected to at least one pull-up resistor, and the method may further include determining the type of the input signal according to a detected voltage from the at least one pull-up resistor.

Exemplary embodiments of the present general inventive concept may also be achieved by providing an apparatus, including at least one input terminal to receive an input signal from an external device, an identification unit having a first identification pin and a second identification pin each connected to a pull-up resistor to output an identification signal, and at least one output terminal to output the identification signal.

Exemplary embodiments of the present general inventive concept may also be achieved by providing an external apparatus, including at least one terminal, and a controller to generate one or more signals with different levels to represent an image through the at least one terminal.

Exemplary embodiments of the present general inventive concept may also be achieved by providing a display apparatus, including at least one terminal to receive an input signal, and a controller to perform one of processes corresponding to the input signal.

Exemplary embodiments of the present general inventive concept may also be achieved by providing a system, including an external apparatus, including at least one terminal, and a controller to generate one or more signals with different levels to represent an image through the at least one terminal, and a display apparatus, including at least one terminal to receive the one or more signals, and a controller to perform one of processes corresponding to the one or more signals.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
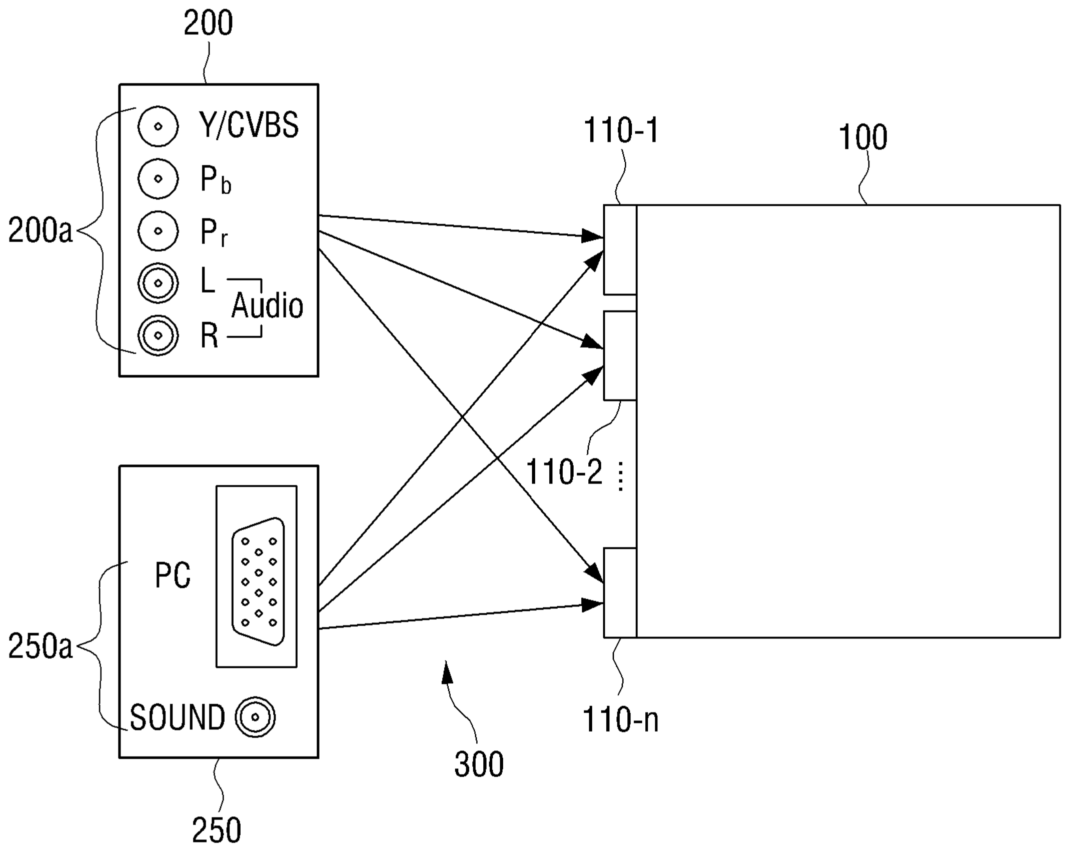
FIG. 1 is a schematic view illustrating a display apparatus and connection units connected to the display apparatus according to an exemplary embodiment of the present general inventive concept.

Reference will now be made in detail to exemplary embodiments of the present general inventive concept, examples of which are illustrated in the accompanying drawings, wherein like reference numerals refer to like elements throughout. The exemplary embodiments are described below in order to explain the present general inventive concept by referring to the figures.

FIG. 1 is a schematic view illustrating a display apparatus and connection units connected to the display apparatus according to an exemplary embodiment of the present general inventive concept.

Referring to FIG. 1, a display apparatus 100 may include a plurality of connection terminals 110-1, 110-2, . . . , 110-*n*, each of which can be connected to a first connection unit 200 or a second connection unit 250.

The first connection unit 200 and the second connection unit 250 can be connected to an external device through a cable to receive video and audio signals. For example, the external devices can be an apparatus to process, generate and/or retrieve data, such as a personal computer (PC), a portable computer apparatus (including a laptop, palmtop, and ultraportable computer), and a portable telecommunications apparatus (including a cell phone and a smartphone). The data which the external device can process, generate or retrieve can include image data, sound data, text data, control data, and any combination thereof.

The display apparatus 100 can also include a connecting unit 300 to connect the connection terminals 110-1 . . . 100-*n* to the first connection unit 200 and/or to the second connection unit 250. The connecting unit 300 can connect the first connection unit 200 and the second connection unit 250 to any of the connection terminals 110-1 . . . 110-*n* to enable a signal received from an external device at the first connection unit 200 and the second connection unit 250 to be transmitted to the display apparatus 100 through the connection terminals 110-1 . . . 110-*n*. The connecting unit 300 may also connect a first group of the connection terminals 110-1 . . . 110-*n* to the first connection unit 200, and the connecting unit 300 may also connect a second group of connection terminals 110-1 . . . 110-*n* to the second connection unit 250. The first group and the second group of the connection terminals may be separate groups, or the first group and the second group of the connection terminals may overlap.

Herein, the plurality of connection terminals 110-1, 110-2, . . . , 110-*n* have small height and volume which are suitable for the slim display apparatus 100, and also can have a substantially similar configuration and shape. That is, the plurality of connection terminals 110-1, 110-2, . . . , 110-*n* can be the same in the number of pins and pin arrangements thereof.

The first connection unit 200 may include Radio Corporation of America (RCA) input terminals 200*a* at the input side to receive composite and component images and sounds, and may be connected to the plurality of connection terminals 110-1, 110-2, . . . , 110-*n* at the output side. The input terminals 200*a* of the first connection unit 200 may include, for example, a Y/CVBS input to input a composite or component signal of an image, a Pb and a Pr input to receive a component signal of an image, and L and R audio inputs to receive an audio signal. These exemplary input terminals are not limitations, and any input terminals can be included on the first connection unit 200.

The second connection unit 250 may include input terminals 250*a* at the input side, for example, a D-SUB 15 pin terminal to receive a PC image and a sound input terminal to receive a sound at the input side, and the second connection unit 250 may be connected to the plurality of connection terminals 110-1, 110-2, . . . , 110-*n* at the output side. The exemplary input terminals described here are not limitations, and any input terminals can be included on the second connection unit 250.

The output sides of the first connection unit 200 and the second connection unit 250 can have the same shape so as to be connectible to any one of the plurality of connection terminals 110-1, 110-2, . . . , 110-*n*.

Figure 2:
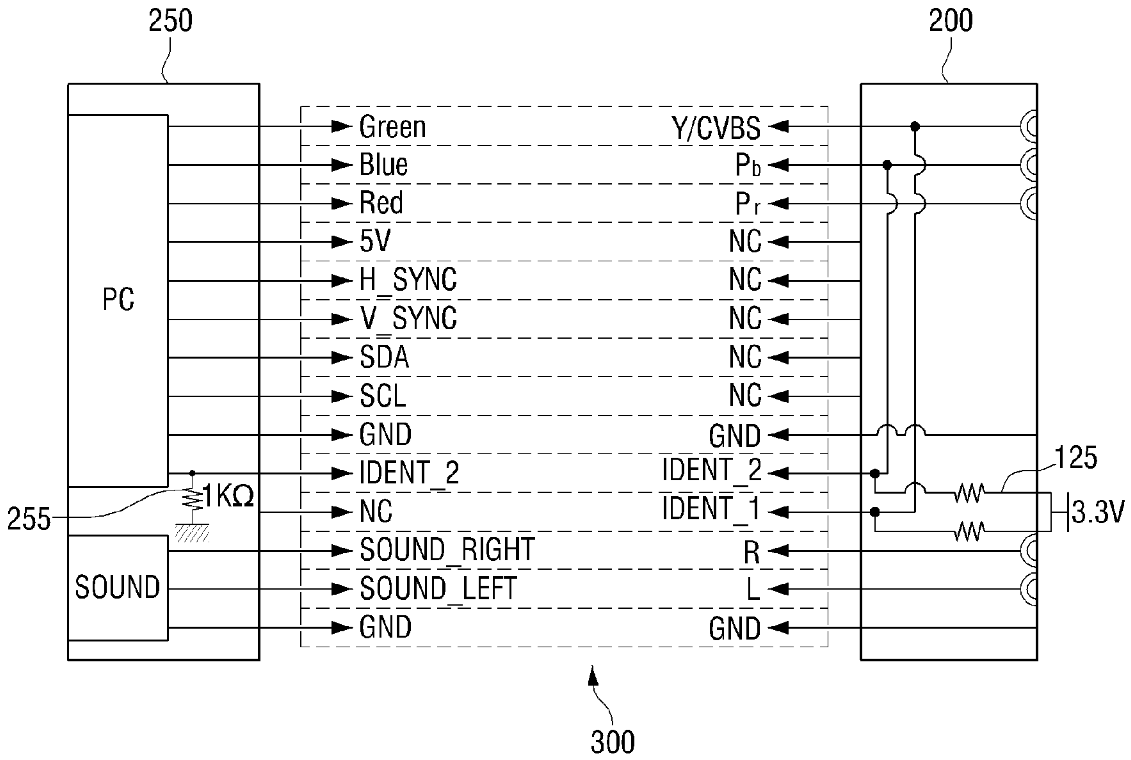
FIG. 2 is a diagram illustrating the connection units connected to the display apparatus in detail according to an exemplary embodiment of the present general inventive concept.

FIG. 2 is a diagram illustrating the connection units 200 and 250 connected to the display apparatus in detail according to an exemplary embodiment of the present general inventive concept.

The first connection unit 200 may include at the output side a Y/CVBS pin to output a brightness signal included in a composite image or component image, a Pb pin and a Pr pin to output a color difference signal included in a component image, an R pin to output a right sound, an L pin to output a left sound, a ground (GND) pin, and a no connect (NC) pin which is idle.

Also, the first connection unit 200 may further include an IDENT_1 pin connected to the Y/CVBS pin in parallel and an IDENT_2 pin connected to the Pb pin in parallel. The IDENT_1 pin and the IDENT_2 pin can be used to determine the format of a video signal which is input through the first connection unit 200 when the first connection unit 200 is connected to the display apparatus 100. The IDENT_1 pin and the IDENT_2 pin may be connected to a voltage source through a pull-up resistor 125, which is further described below.

The second connection unit 250 may include at the output side a green pin, a blue pin, and a red pin to output a color signal of a PC image, an H_SYNC pin and an V_SYNC pin to output a horizontal synchronization signal and a vertical synchronization signal of a PC image, an SDA pin to output a control signal from the PC, an SCL pin to output clock signal, a 5V pin to be supplied with power from the PC, a SOUND_RIGHT pin to output a right sound, a SOUND_LEFT pin to output a left sound, a GND pin, and an NC pin which is idle.

Also, the second connection unit 250 can include an IDENT_2 pin connected to a pull-down resistor 255 of, for example, 1 Kohm, which can be used to determine the format of input signal by determining which of the first connection unit 200 and the second connection unit 250 is connected to the display apparatus 100.

The output side of the first connection unit 200 and the second connection unit 250 may connect to the connecting unit 300 to connect the connection terminals 110-1 . . . 100-*n* to the first connection unit 200 and to the second connection unit 250. The connecting unit 300 can connect the first connection unit 200 and the second connection unit 250 to any of the connection terminals 110-1 . . . 110-*n* to enable a signal, which may be an image data signal, a sound signal, or a control data signal to control the first connection unit 200 and/or the second connection unit 250, received from an external device at the first connection unit 200 and the second connection unit 250 to be transmitted to the display apparatus 100 through the connection terminals 110-1 . . . 110-*n*.

Although the first connection unit 200 and the second connection unit 250 are illustrated in FIG. 2 as having 14 pins at the output side, this is not a limitation, and the number of pins at the output side of the first connection unit 200 and the second connection unit 250 may differ according to necessity.

Figure 3:
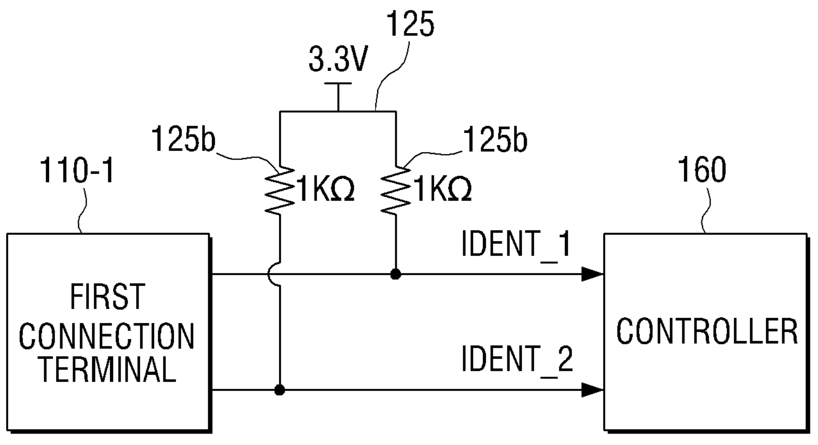
FIG. 3 is a block diagram illustrating components which can be used to determine the format of an input image according to an exemplary embodiment of the present general inventive concept.

FIG. 3 is a block diagram illustrating components of the display apparatus which can be used to determine the format of an input image.

Referring to FIG. 3, the IDENT_1 pin and the IDENT_2 pin of the first connection terminal 110-1 can be connected to a 3.3V source by a pull-up resistor 125, and a controller 160 can detect the voltage of the IDENT_1 pin and the IDENT_2 pin to determine the format of video signal input through the first connection terminal 110-1. The pull-up resistor 125 can include a first pull up-resistor 125*a* and a second pull-up resistor 125*b*. The first pull-up resistor 125*a* can be connected to the IDENT_2 pin, and the second pull-up resistor 125*b* can be connected to the IDENT_1 pin. Each of the first and second pull-up resistors 125*a* and 125*b* can have a resistance, for example, of 1 Kohm. As illustrated in Table 1, the controller 160 can determine whether the input video signal is composite video signal, component video signal, or digital RGB video signal input from the PC, depending on whether the voltage of the IDENT_1 pin and the IDENT_2 pin are in a high state or a low state, or on the detected voltage (for example, half voltage, where 3.3V/2=1.65V).

TABLE 1

| Input Video Signal | No signal | Composite | Component | PC |
|---|---|---|---|---|
| IDENT_1 pin | 3.3 V | 0 V | 0 V | X |
| IDENT_2 pin | 3.3 V | 3.3 V | 0 V | 1.65 V |

As illustrated in Table 1, if the IDENT_1 pin and the IDENT_2 pin are detected to be in a high state of 3.3V, the controller can determine that no video signal is input through the first connection terminal 110-1. That is, if the first connection unit 200 is not connected to the first connection terminal 110-1 or if the first connection unit 200 is connected to the first connection terminal 110-1 but no external device is connected to the first connection unit 200, the IDENT_1 pin and the IDENT_2 pin can be detected to be 3.3V. In this case, the controller 160 can determine that no video signal is input.

In the case that the first connection unit 200 is connected to the first connection terminal 110-1, if the IDENT_1 pin is detected to be in a low state of 0V and the IDENT_2 pin is detected to be in a high state of 3.3V, the controller 160 can determine that the format of an input video signal is a composite video signal. Also, in the case that the first connection unit 200 is connected to the first connection terminal 110-1, if the IDENT_1 pin is detected to be in a low state of 0V and the IDENT_2 pin is also detected to be in a low state of 0V, the controller 160 can determine that the format of input video signal is a component video signal.

Regardless of the state of the IDENT_1 pin, if the IDENT_2 pin is detected to be 1.65V, the controller 160 can determine that the second connection unit 250 is connected to the first connection terminal 110-1 and that the format of input video signal is digital RGB video signal provided from a PC. If the second connection unit 250 is connected to the first connection terminal 110-1 but the PC is not connected, no signal is received from the PC and thus the controller 160 can determine that no video signal is input.

Figure 4:
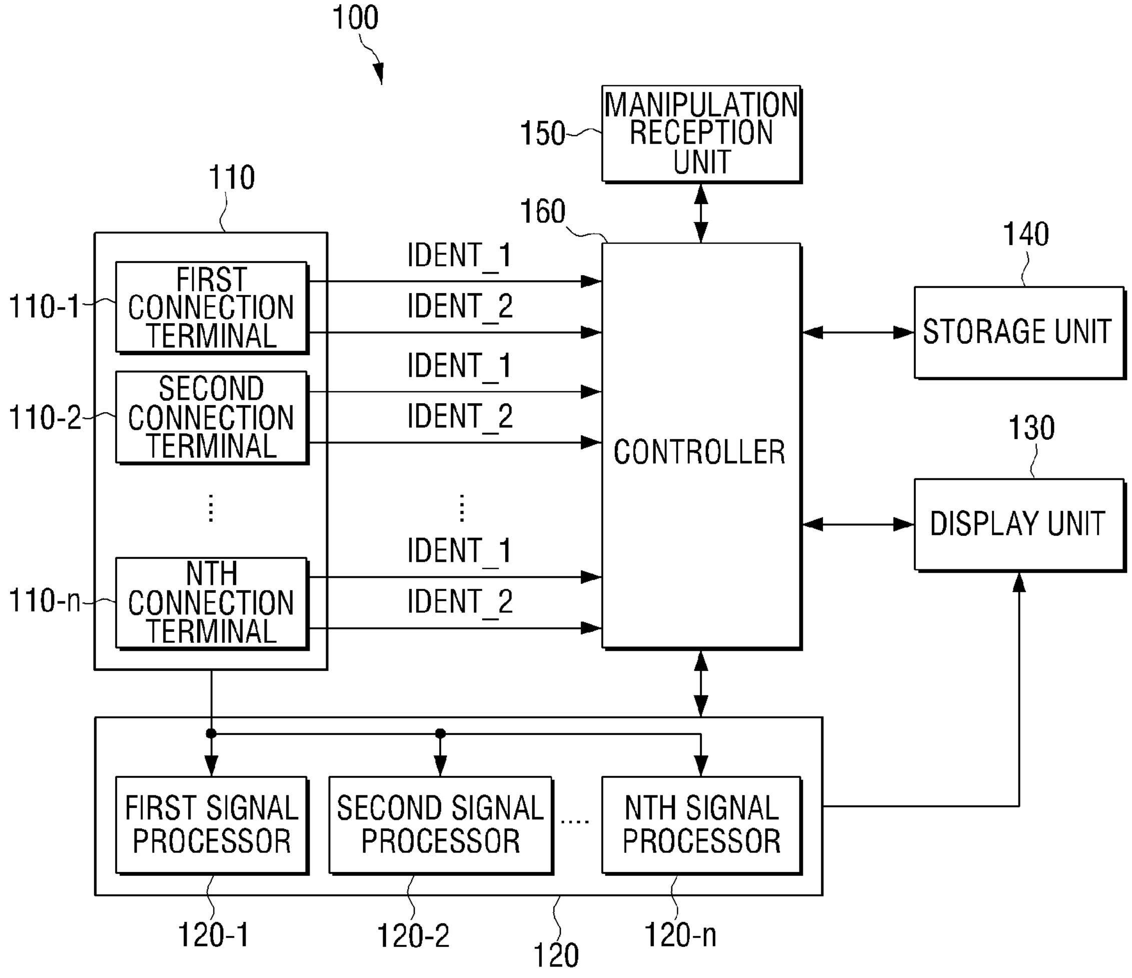
FIG. 4 is a block diagram illustrating the display apparatus according to an exemplary embodiment of the present general inventive concept.

FIG. 4 is a block diagram illustrating the display apparatus 100 according to an exemplary embodiment of the present general inventive concept.

Referring to FIG. 4, the display apparatus 100 may include a connection unit 110, a signal processing unit 120, a display unit 130, a storage unit 140, a manipulation reception unit 150, and a controller 160.

The connection unit 110 may include a plurality of connection terminals 110-1, 110-2, . . . , 110-*n* which can have the same shape. That is, the plurality of connection terminals 110-1, 110-2, . . . , 110-*n* can have, for example, the same number of pins and the same pin arrangement. The video signal input through the plurality of connection terminals 110-1, 110-2, . . . , 110-*n* is transmitted to the signal processing unit 120. Each of the connection terminals 110-1, 110-2, . . . , 110-*n* may include an IDENT_1 pin and an IDENT_2 pin to determine the format of input video signal. The IDENT_1 pin and the IDENT_2 pin are connected to the controller 160.

The signal processing unit 120 may include a plurality of signal processors 120-1, 120-2, . . . , 120-*n* to process the video signal input through the connection unit 110. The signal processing unit 120 can signal-process the input video signal according to the control of the controller 160 if the controller 160 determines the format of video signal input through the connection unit 110.

The display unit 130 can display the video signal signal-processed by the signal processing unit 120 on an output device such as a screen. The display unit 130 may employ a mechanism such as, for example, a cathode ray tube (CRT), a liquid crystal display (LCD), a plasma display panel (PDP), and an organic light-emitting diode (OLED) to display the processed video signal.

The storage unit 140 can store a control program to operate the display apparatus 100 and various data which are generated during the operation of the display apparatus. For example, a table such as Table 1 may be stored in the storage unit 140 so that the controller 160 can detect the status of the IDENT_1 pin and the IDENT_2 pin and then can determine the format of input video signal by referring to Table 1.

The manipulation reception unit 150 can have various keys to receive a user command to control the operation of the display apparatus 100, and also may further include, for example, an infrared ray receiver or another appropriate receiver, to receive a user command from a remote controller (not illustrated).

The controller 160 can determine the format of input video signal by detecting the status of the IDENT_1 pin and the IDENT_2 pin of each the connection terminals 110-1, 110-2, . . . , 110-*n*. That is, if the IDENT_1 pin and the IDENT_2 pin which are connected one of the plurality of connection terminals 110-1, 110-2, . . . , 110-*n* are detected to be in a high state, it can be determined that there is no input video signal in the corresponding connection terminal. Also, if the IDENT-1 pin is detected to be in a low state and the IDENT_2 pin is detected to be in a high state, it can be determined that a composite video signal is input through the corresponding connection terminal. Also, if both of the IDENT_1 pin and the IDENT_2 pin are detected to be in a low state, it can be determined that a component video signal is input through the corresponding connection terminal.

In addition, regardless of the state of the IDENT_1 pin, if the IDENT_2 pin is detected to have a half of a pull-up voltage, it can be determined that a video signal in a digital RGB video format transmitted from the PC is input through the corresponding connection terminal.

The controller 160 can control the signal processing unit 120 to process the input video signal according to the result of the above-described determination. Also, the controller 160 may generate and display an on-screen display (OSD) menu to allow a user to select one of the input video signals. In this case, the video signal which has not been input is deactivated so that it is not capable of being selected. If two or more video signals of the same format are input, an OSD menu can be generated to distinguish the video signals and to permit a user to select from among the input signals.

Figure 5:
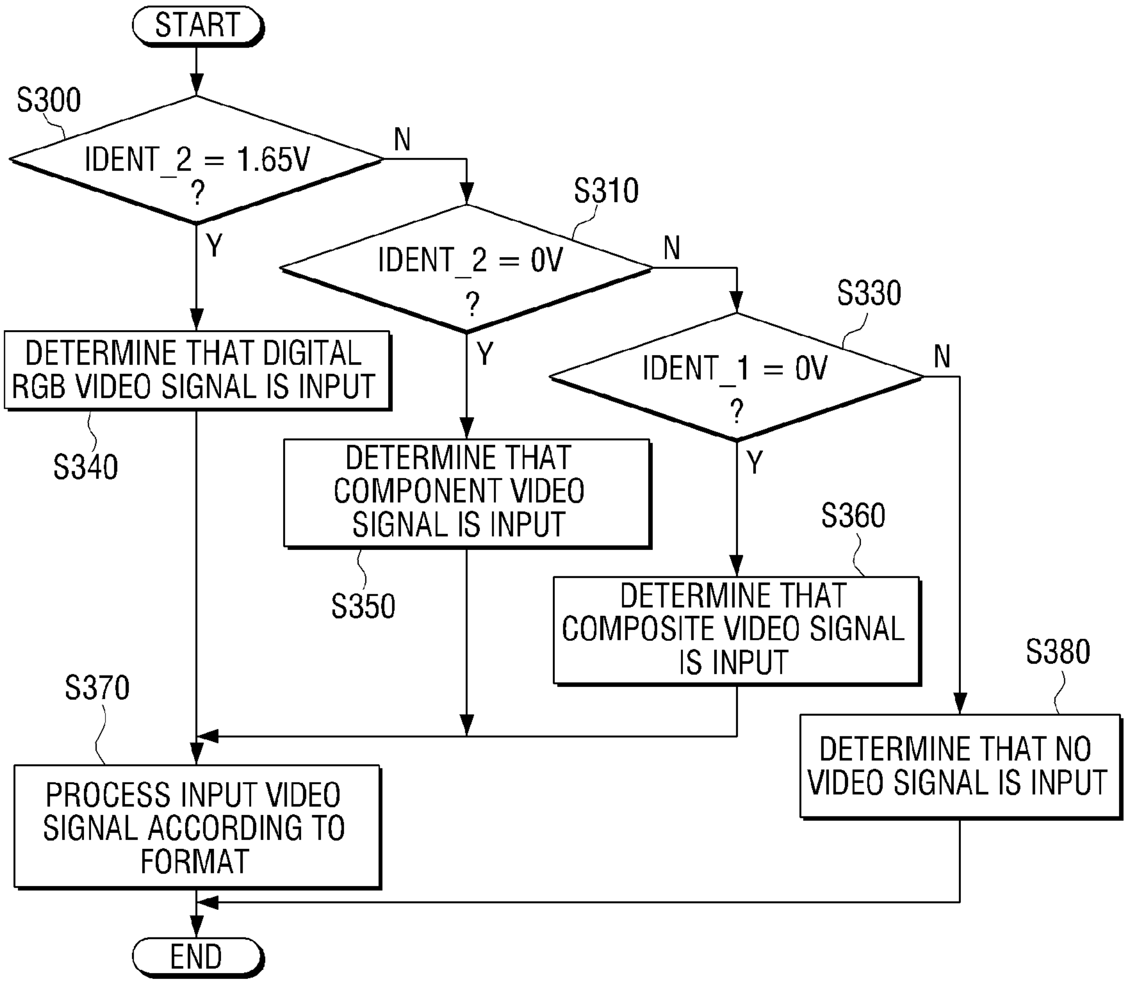
FIG. 5 is a flowchart illustrating a method for determining the format of an input image of the display apparatus according to an exemplary embodiment of the present general inventive concept.

FIG. 5 is a flowchart illustrating a method of determining the format of an input image of the display apparatus according to an exemplary embodiment of the present general inventive concept.

Referring to FIG. 5, if the voltage of the IDENT_2 pin is detected to be 1.65V in operation S300-Y, the controller 160 determines that a digital RGV video signal is input in operation S340. That is, if the voltage of the IDENT_2 pin is detected to be 1.65V, the controller 160 determines that the input video signal is a digital RGB video signal transmitted from the PC regardless of the voltage of the IDENT_1 PIN.

In operation S300, if the detected voltage is not 1.65V (S300-N) and if the voltage is detected to be 0V (S310-Y), the controller 160 determines that a component video signal is input in operation S350. That is, referring to FIG. 2, if video signal is input to the Pb pin which outputs color difference signal included in a component image, the voltage of the IDENT_2 pin is detected to be 0V. Accordingly, the voltage of the IDENT_1 pin can be detected to be 0V, and thus the controller 160 can determine that the input video signal is a component video signal.

In operation S310, if the detected voltage is 3.3V rather than 0V (S310-N), the controller 160 detects the voltage of the IDENT_1 pin. If the voltage of the IDENT_1 pin is detected to be 0V (S330-Y), the controller 160 determines that a composite video signal is input in operation S360. That is, if the voltage of the IDENT_1 pin is 0V and the voltage of the IDENT_2 pin is 3.3V, the controller 160 determines that the input video signal is a composite video signal.

In operation S330, if the detected voltage is 3.3V rather than 0V (S330-N), the controller 160 determines that no video signal is input in operation S380. That is, if the voltage of the IDENT_1 pin is 3.3V and if the voltage of the IDENT_2 is 3.3V, the controller 160 can determine that no video signal is input through the corresponding connection terminal.

The controller 160 signal-processes the input video signals according to the determined format in operation S370.

Through the above-described process, the format of an input video signal can be determined and the video signal can be processed according to the format. Also, since the display apparatus 100 receives video and audio signals from an external device through the connection units 200, 250 without being directly connected to the external device, it is possible to maintain the slim thickness of the display apparatus 100.

Figure 6:
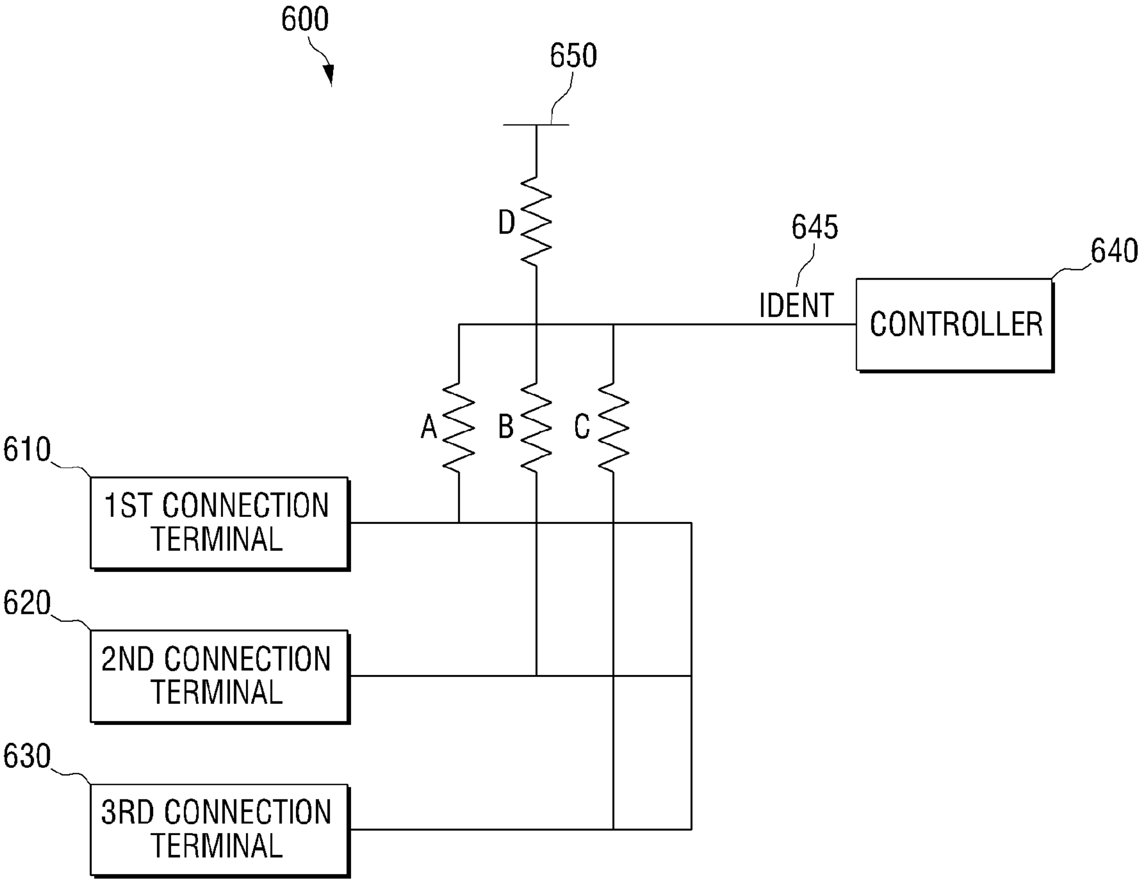
FIG. 6 is a view illustrating components which can be used to determine the formats of a plurality of input images of a display apparatus according to another exemplary embodiment of the present general inventive concept.
Figure 7:
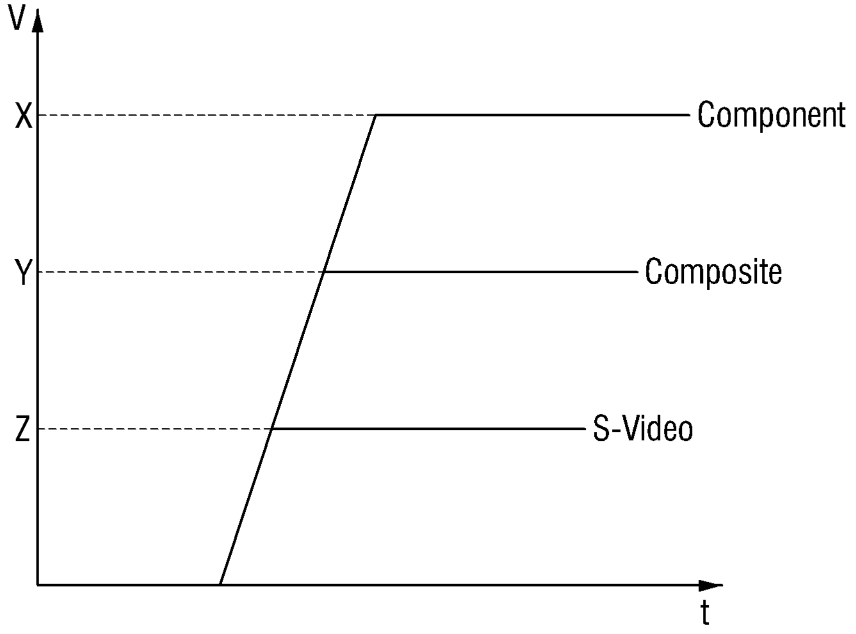
FIG. 7 is a graph illustrating output voltage values of input images which are input to the display apparatus illustrated in FIG. 6.

Referring to FIGS. 6 and 7, a method of determining the formats of a plurality of video signals which are input to a plurality of connection terminals is described below.

FIG. 6 is a view illustrating components which can be used to determine the formats of input images on a display apparatus 600 if a plurality of video signals are input to a plurality of connection terminals, according to another exemplary embodiment of the present general inventive concept.

Referring to FIG. 6, a first connection terminal 610 can be connected to a power source 650 through a pull-up resistor A, a second connection terminal 620 can be connected to the power source 650 through a pull-up resistor B, and a third connection terminal 630 can be connected to the power source 650 through a pull-up resistor C. A controller 640 can detect the voltage of an IDENT pin 645 to determine the formats of video signals which are input through the first connection terminal 610, the second connection terminal 620, and the third connection terminal 630. The plurality of connection terminals 610, 620, 630 can receive only the video signals which are set for each of the connection terminals 610, 620, 630. For example, if the first connection terminal 610 is a component terminal, only a component video signal is input. The plurality of connection terminals 610, 620, 630 can be connected to the controller 640 through a single IDENT pin 645. Power source 650 can be, for example, a 5V power source, and power source 645 can be connected to the circuit through a pull-up resistor D Prior to explaining determining the formats of a plurality of input video signals, measuring voltage at a certain video signal terminal according to the level of pull-up resistance is explained with reference to FIG. 7.

For example, if the first connection terminal 610 is a component terminal, the voltage can be measured to be X according to the pull-up resistance of the component terminal. If the second connection terminal 620 is a composite terminal, the voltage can be measured to be Y according to the pull-up resistance of the composite terminal. If the third connection terminal 630 is an S-video terminal, the voltage can be measured to be Z according to the pull-up resistance of the S-video terminal. Accordingly, it is possible to know the level of measured voltage based on the pull-up resistance of the input video signal, and the controller 640 can determine the format of the input video signal by measuring the level of the voltage.

Referring back to FIG. 6, a method of determining the formats of a plurality of video signals which are input to a plurality of connection terminals is described.

For example, it is assumed that the first connection terminal 610 is a component terminal, the second connection terminal 620 is a composite terminal, and the third connection terminal 630 is an S-video terminal. In this situation, the number of cases to be determined is 3 if one video signal is input, 3 if two video signals are input, 1 if three video signals are input, and 1 if no video signal is input. Therefore, there are 8 cases in total.

The controller 640 can determine the format of an input video signal according to the detected voltage of the video signal as illustrated in Table 2:

TABLE 2

| Number of cases | Input Video Signal | Resistance Value | Voltage (V) |
|---|---|---|---|
| 1 | None | D = 10 | 5 |
| 2 | S-video | C = 10 | 2.5 |
| 3 | Composite | B = 13 | 2.82 |
| 4 | Component | A = 21 | 3.39 |
| 5 | Component, Composite | A//B = 5.65 | 1.80 |
| 6 | S-video, Composite | B//C = 6.77 | 2.01 |
| 7 | S-video, Component | A//C = 8.02 | 2.22 |
| 8 | S-video, Component, Composite | A//B//C = 4.45 | 1.54 |

As illustrated in table 2, if the voltage at the IDENT pin 645 is detected to be 5V, the controller 640 can determine that there is no input video signal. That is, since no video signal is input to the connection terminal, the IDENT pin 645 is connected to only the resistor D and thus the voltage measured at the IDENT pin 645 is 5V. Therefore, the controller 640 can determine that no video signal is input.

If the voltage at the IDENT pin 645 is detected to be 2.5V, the controller 640 can determine that the input video signal is an S-video signal. That is, since an S-video signal is input to the S-video terminal 630, the IDENT pin 645 is connected to the resistor A and thus the voltage measured at the IDENT pin 645 is 2.5V. Therefore, the controller 640 can determine that the input video signal is an S-video signal.

Likewise, if the voltage at the IDENT pin 645 is detected to be 2.82V, it can be determined that the input video signal is a composite signal, and, if the voltage at the IDENT pin 645 is 3.39V, it can be determined that the input video signal is a component signal.

If two video signals are input, the format of the video signals can be determined in the same way as in the case where one video signal is input. For example, if the voltage at the IDENT pin 645 is detected to be 1.80V, the controller 640 can determine that the input video signals are component and composite signals. That is, since a component video signal is input to the component terminal 610 and a composite video signal is input to the composite terminal 620, the IDENT pin 645 is connected to the resistors A and B, and thus the voltage measured at the IDENT pin 645 is 1.80V. Therefore, the controller 640 can determine that the input video signals are component and composite signals.

Likewise, if the voltage at the IDENT pin 645 is detected to be 2.0V, it can be determined that the input video signals are S-video and composite signals, and, if the voltage at the IDENT pin is detected to be 2.22V, it is determined that the input video signals are S-video and component signals.

If three video signals are input, the format of the video signals can be determined in the same way as in the case where one or two video signals are input. For example, if the voltage at the IDENT pin 645 is detected to be 1.54V, the controller 640 can determine that the input video signals are component, composite, and S-video signals. That is, since a component video signal is input to the component terminal 610, a composite video signal is input to the composite terminal 620, and an S-video signal is input to the S-video terminal 630, the IDENT pin is connected to the resistors A, B, and C, and thus the voltage measured at the IDENT pin is 1.54V. Therefore, the controller 640 can determine that the input video signals are component, composite, and S-video signals.

The three connection terminals described as provided in the display apparatus of the above exemplary embodiment are merely examples and are not intended to be limitations. For example, the present general inventive concept may also be applied to a display apparatus having at least one connection terminal.

The first connection unit 200 and the second connection unit 250 can also generate a plurality of signals each with one of different voltages. Each of the plurality of signals can represent a different type of input video signal, such as component, composite, digital RBG, and S-video, each having a different voltage. The first connection unit 200 and the second connection unit 250 can provide them for input to the display apparatus 100, either directly to the connection terminals 110-1 . . . 110-*n*, or to the connecting unit 300 to be provided to the connection terminals 110-1 . . . 110-*n*. Each of the first connection unit 200 and the second connection unit 250 can generate different video signals simultaneously, and a user can select from among a plurality of simultaneously generated video signals of the same or different types. Each of the first connection unit 200 and the second connection unit 250 can also generate different types of video signals selectively, as may be selected by a user.

Also, the component, composite, and S-video signals described in this exemplary embodiment are merely examples and are not limitations, and any other type video signal may be applied.

According to the above-described method, even if a plurality of video signals are input to a plurality of input terminals, the formats of the video signals can be determined without the need for a separate main board to a circuit.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in distributed fashion. The computer-readable transmission medium can transmit carrier waves and signals (e.g., wired or wireless data transmission through the Internet). Also, functional programs, codes, and code segments to accomplish the present general inventive concept can be easily construed by programmers skilled in the art to which the present general inventive concept pertains.

Although various exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A display apparatus comprising:

a display panel;

a connecting unit, external to the display apparatus, connectible to a first video/audio source or a second video/audio source;

a single set of connection terminals, having a first subset and a second subset, installed in the display apparatus, the single set of connection terminals to which any one of the first and second video/audio sources is connectible via a connection unit to receive respective video and audio signals such that the first subset of connection terminals is used to receive video and audio signals from the first video/audio source and the second subset of connection terminals is used to receive video and audio signals from the second video/audio source, and each terminal in the single set of connection terminals is the same in a shape, a number of pins, and pin arrangements thereof, the single set of connection terminals being the only terminals disposed on the display apparatus to receive the video and audio signals;

a controller to determine which one of the first and second video/audio sources is transmitting video and audio signals which are input through the connection unit and the connection terminals; and a signal processing unit to process the video and audio signals received via the connection terminals according to the determined one of the first and second video/audio sources, wherein the connection unit is external to the display apparatus and includes a cable removably connected between the connection unit and the respective one of the first and second video/audio sources, an output side of the connection unit connected to the connection terminals, via the connecting unit, having a same shape as that of the connection terminals, and an input side of the connection unit having a different shape from that of the output side.

2. The display apparatus as claimed in claim 1, wherein each of the connection terminals is individually connected to the controller through a first determination pin and a second determination pin, wherein the first and the second determination pins are connected to a first pull-up resistor and a second pull-up resistor respectively.

3. The display apparatus as claimed in claim 2, wherein, with respect to a connection terminal in which a voltage detected through one of the first and the second determination pins is a half of a pull-up voltage, the controller determines that a Red, Green, Blue (RGB) digital video signal is input.

4. The display apparatus as claimed in claim 2, wherein, with respect to a connection terminal in which a voltage detected through one of the first and the second determination pins is low and a voltage detected through the other determination pin is high, the controller determines that a composite video signal is input.

5. The display apparatus as claimed in claim 2, wherein, with respect to a connection terminal in which a voltage detected through both the first and the second determination pins is low, the controller determines that a component video signal is input.

6. The display apparatus as claimed in claim 2, wherein, with respect to a connection terminal in which a voltage detected through both of the first and the second determination pins is high, the controller determines that no video signal is input.

7. The display apparatus as claimed in claim 1, wherein the plurality of connection units comprises at least one terminal of a D-subminiature (D_SUB) terminal and a terminal to receive a composite video input and two audio inputs.

8. The display apparatus as claimed in claim 7, wherein the first determination pin is connected to a pin into which a brightness signal included in a component signal and a composite signal are input, and the second determination pin is connected to one of a pin into which a color difference signal included in a component signal is input and a predetermined pin of a D-subminiature (D_SUB) terminal.

9. The display apparatus as claimed in claim 1, wherein the controller determines a type of at least one input signal which is input from an external device, which is connected to the connection unit connected to the connection terminals, through the connection unit and the connection terminals, wherein the signal processing unit processes the at least one input signal in a method corresponding to the determined type.

10. The display apparatus as claimed in claim 9, wherein the connection terminals is connected to the controller through a single determination pin.

11. The display apparatus as claimed in claim 10, wherein the controller determines the type of the at least one input signal using a voltage detected at the determination pin.

12. The display apparatus as claimed in claim 9, wherein the at least one input signal comprises at least one of a component signal, a composite signal, and an Separate Video (S-video) signal.

13. The display apparatus as claimed in claim 9, wherein the connection terminals receive only a video signal which is set for each of the connection terminals.

14. A method of determining types of an input signal of a display apparatus comprising a display panel, a connecting unit, external to the display apparatus, connectible to a first video/audio source or a second video/audio source, a single set of connection terminals installed in the display apparatus, having a first subset and a second subset, the single set of connection terminals to which any one of the first and second video/audio sources is connectible via a connection unit to receive respective video and audio signals such that the first subset of connection terminals is used to receive video and audio signals from the first video/audio source and the second subset of connection terminals is used to receive video and audio signals from the second video/audio source, the method comprising:

determining which one of the first and second video/audio sources is transmitting video and audio signals which are input through the connection unit and the connection terminals; and processing the video and audio signals received via the connection terminals according to the determined one of the first and second video/audio sources, wherein the connection unit is disposed external to the display apparatus and includes a cable removably connected between the connection unit and the respective one of the first and second video/audio sources, an output side of the connection unit connected to the connection terminals, via the connecting unit, having a same shape as that of the connection terminals, and an input side of the connection unit having a different shape from that of the output side, and wherein each terminal in the single set of connection terminals is the same in a shape, a number of pins, and pin arrangements thereof, and the single set of connection terminals being the only terminals disposed on the display apparatus to receive the video and audio signals.

15. The method as claimed in claim 14, wherein the determining further comprises: detecting voltage through pull-up resistors connected to a first determination pin and a second determination pin which are included in each of the connection terminals and determining one of the first and second video/audio sources.

16. The method as claimed in claim 15, wherein, with respect to a connection terminal in which a voltage detected through one of the first and the second determination pins is a half of a pull-up voltage, the determining further comprises: determining that a Red, Green, Blue (RGB) digital video signal is input.

17. The method as claimed in claim 15, wherein, with respect to a connection terminal in which a voltage detected through one of the first and the second determination pins is low and a voltage detected through the other determination pin is high, the determining further comprises: determining that a composite video signal is input.

18. The method as claimed in claim 15, wherein, with respect to a connection terminal in which a voltage detected through both the first and the second determination pins is low, the determining further comprises: determining that a component video signal is input.

19. The method as claimed in claim 15, wherein, with respect to a connection terminal in which a voltage detected through both of the first and the second determination pins is high, the determining further comprises: determining that no video signal is input.

20. The method as claimed in claim 14, wherein the connection unit further comprises at least one terminal of a D-subminiature (D_SUB) terminal and a terminal to receive a composite video input and two audio inputs.

21. The method as claimed in claim 15, wherein the first determination pin is connected to a pin into which a brightness signal included in a component signal and a composite signal are input, and the second determination pin is connected to one of a pin into which a color difference signal included in a component signal is input and a predetermined pin of a D-subminiature (D_SUB) terminal.

22. The method as claimed in claim 14, wherein the determining further comprises: determining a type of at least one input signal which is input from an external device, which is connected to the connection unit connected to the connection terminals, through the connection unit and the connection terminals, wherein the processing comprises processing the at least one input signal in a method corresponding to the determined type.

23. The method as claimed in claim 22, wherein the connection terminals is connected to a controller through a single determination pin.

24. The method as claimed in claim 23, wherein the determining further comprises: determining the type of the at least one input signal using a voltage detected at the determination pin.

25. The method as claimed in claim 22, wherein the at least one input signal further comprises at least one of a component signal, a composite signal, and a Separate Video (S-video) signal.

26. The method as claimed in claim 22, wherein the connection terminals receives only a video signal which is set for each of the connection terminal.

27. A display apparatus, comprising: a display panel; a connecting unit, external to the display apparatus, connectible to a first video/audio source or a second video/audio source; a connection terminal unit having a single set of connection terminals, having a first subset and a second subset, installed in the display apparatus, the single set of connection terminals to which any one of the first and second video/audio sources is connectible via the connection unit to receive respective video and audio signals such that the first subset of connection terminals is used to receive video and audio signals from the first video/audio source and the second subset of connection terminals is used to receive video and audio signals from the second video/audio source, and each terminal in the single set of connection terminals is the same in a shape, a number of pins, and pin arrangements thereof, and the single set of connection terminals being the only terminals disposed on the display apparatus to receive the video and audio signals; and a controller connected to the connection terminal unit to determine which one of the first and second video/audio sources is transmitting video and audio signals which are input through the connection unit and the connection terminals according to a level of the input signal and to process the video and audio signals according to the determined one of the first and second video/audio sources, wherein the connection unit is external to the display apparatus and includes a cable removably connected between the connection unit and the respective one of the first and second video/audio sources, an output side of the connection unit connected to the connection terminals, via the connecting unit, having a same shape as that of the connection terminals, and input side of the connection unit having a different shape from that of the output side.

28. The display apparatus of claim 27, wherein each of the connection terminals is connected to a respective determination pin, and the controller determines one of the first and second video/audio sources according to a signal from the determination pin.

29. The display apparatus of claim 28, wherein the determination pin is connected to at least one pull-up resistor, and the controller determines one of the first and second video/audio sources according to a detected voltage from the at least one pull-up resistor.

30. A method of determining a type of an input signal in a display apparatus including a display panel, a connecting unit, external to the display apparatus, connectible to a first video/audio source or a second video/audio source, and a connection terminal unit having a single set of connection terminals, having a first subset and a second subset, installed in the display apparatus, the single set of connection terminals to which any one of the first and second video/audio sources is connectible via the connection unit to receive respective video and audio signals such that the first subset of connection terminals is used to receive video and audio signals from the first video/audio source and the second subset of connection terminals is used to receive video and audio signals from the second video/audio source, the method comprising:

receiving an input signal from the external device; determining which one of the first and second video/audio sources is transmitting video and audio signals which are input through the connection unit and the connection terminals according to the received video and audio signals; and processing the input signal according to the determined one of the first and second video/audio sources, wherein the connection unit is external to the display apparatus and includes a cable removably connected between the connection unit and the respective one of the first and second video/audio sources, an output side of the connection unit connected to the connection terminals, via the connecting unit, having a same shape as that of the connection terminals, and an input side of the connection unit having a different shape from that of the output side, and wherein each terminal in the single set of connection terminals is the same in a shape, in a number of pins, and pin arrangements thereof, and the single set of connection terminals being the only terminals disposed on the display apparatus to receive the video and audio signals.

31. The method of claim 30, wherein the at least one connection terminal is connected to a determination pin, further comprising: determining one of the first and second video/audio sources according to a signal from the determination pin.

32. The method of claim 31, wherein the determination pin is connected to at least one pull-up resistor, further comprising: determining one of the first and second video/audio sources according to a detected voltage from the at least one pull-up resistor.

33. An external apparatus, comprising: a plurality of terminals to receive respective types of video and audio signals corresponding to types of the terminals, the video and audio signals including video and audio signals from a first video/audio source and video and audio signals from a second video/audio source; and a controller to generate one or more signals with different levels to represent different types of image formats through the plurality of terminals, the plurality of terminals being connectible to a single set of connection terminals installed in a display apparatus, the single set of connection terminals, having a first subset and a second subset, to which any one of the first and second video/audio sources is connectible via a connection unit to receive respective video and audio signals such that the first subset of terminals is used to receive video and audio signals from the first video/audio source and the second subset of terminals is used to receive video and audio signals from the second video/audio source, and each terminal in the single set of connection terminals is the same in a shape, a number of pins, and pin arrangements thereof, and the single set of connection terminals being the only terminals disposed on the display apparatus to receive the video and audio signals, the display apparatus further including a controller to determine which one of the first and second video/audio sources is transmitting video and audio signals which are input through the connection unit and the connection terminals, and a signal processing unit to process the video and audio signals received via the connection terminals according to the determined one of the first and second video/audio sources, wherein the connection unit is external to the display apparatus and includes a cable removably connected between the connection unit and the respective one of the first and second video/audio sources, an output side of the connection unit connected to the connection terminals having a same shape as that of the connection terminals, and an input side of the connection unit having a different shape from that of the output side.

34. A display apparatus, comprising:

a display panel;

a connecting unit, external to the display apparatus, connectible to a first video/audio source or a second video/audio source;

a single set of connection terminals, having a first subset and a second subset, installed in the display apparatus, the single set of connection terminals to which any one of the first and second video/audio sources is connectible via the connection unit to receive respective video and audio signals such that the first subset of terminals is used to receive video and audio signals from the first video/audio source and the second subset of terminals is used to receive video and audio signals from the second video/audio source, and each terminal in the single set of connection terminals is the same in shape, a number of pins, and pin arrangements thereof, and the single set of connection terminals being the only terminals disposed on the display apparatus to receive the video and audio signals; and a controller to determine which one of the first and second video/audio sources is transmitting video and audio signals which are input through the connection unit and the terminals and to perform one of processes corresponding to the video and audio signals received via the terminals according to the determined one of the first and second video/audio sources, wherein the connection unit is disposed external to the display apparatus and includes a cable removably connected between the connection unit and the respective one of the first and second video/audio sources, an output side of the connection unit connected to the connection terminals, via the connecting unit, having a same shape as that of the connection terminals, and an input side of the connection unit having a different shape from that of the output side end.

35. A system, comprising:

an external apparatus, including:

a plurality of terminals to receive respective types of video and audio signals corresponding to types of the terminals, the video and audio signals including video and audio signals from a first video/audio source and video and audio signals from a second video/audio source; and a controller to generate one or more signals with different levels to represent different types of image formats through the plurality of terminals; and a display apparatus, including:

a display panel; a connecting unit, external to the display apparatus, connectible to a first video/audio source or a second video/audio source;

a single set of connection terminals, having a first subset and a second subset, installed in the display apparatus, the single set of connection terminals to which any one of the first and second video/audio sources is connectible via a connection unit to receive respective video and audio signals such that the first subset of connection terminals is used to receive video and audio signals from the first video/audio source and the second subset of connection terminals is used to receive video and audio signals from the second video/audio source, and each terminal in the single set of connection terminals is the same in a shape, a number of pins, and pin arrangements thereof, and the single set of connection terminals being the only terminals disposed on the display apparatus to receive the video and audio signals; and a controller to determine which one of the first and second video/audio sources is transmitting video and audio signals which are input through the connection unit and the connection terminals and to perform one of processes corresponding to the video and audio signals received via the connection terminals according to the determined one of the first and second video/audio sources, wherein the connection unit is external to the display apparatus and includes a cable removably connected between the connection unit and the respective one of the first and second video/audio sources, an output side of the connection unit connected to the connection terminals, via the connecting unit, having a same shape as that of the connection terminals, and an input side of the connection unit having a different shape from that of the output side end.

36. A system, comprising: a plurality of connection units including input terminals of different types to correspond with respective types of video and audio signals, the video and audio signals including video and audio signals from a first video/audio source and video and audio signals from a second video/audio source;

a single set of connection terminals, having a first subset and a second subset, installed in a display apparatus to receive a plurality of types of video and audio signals from corresponding types of connection units, the single set of connection terminals to which any one of the first and second video/audio sources is connectible via a connection unit to receive respective video and audio signals such that the first subset of connection terminals is used to receive video and audio signals from the first video/audio source and the second subset of connection terminals is used to receive video and audio signals from the second video/audio source, and each terminal in the single set of connection terminals is the same in a shape, a number of pins, and pin arrangements thereof, and the single set of connection terminals being the only terminals disposed on the display apparatus to receive the video and audio signals; a controller to determine which one of the first and second video/audio sources is transmitting video and audio signals received via the connection units and the connection terminals based on the received video and audio signals; and a signal processing unit to process the video and audio signals received via the connection terminals according to the determined one of the first and second video/audio sources, wherein the connection units are external to the display apparatus of the display apparatus and includes a cable removably connected between the connection unit and the respective one of the first and second video/audio sources, an output side of the connection unit connected to the connection terminals having a same shape as that of the connection terminals, and an input side of the connection unit having a different shape from that of the output side end.

37. The system of claim 36, wherein each connection unit has at least one input terminal connectible to an external device to receive an input signal corresponding to the input terminal.

38. The system of claim 36, wherein output sides of the plurality of connection units to connect to the single set of connection terminals have the same shape.

39. The display apparatus as claimed in claim 1, wherein the single set of connection terminals is a single terminal.

40. The method as claimed in claim 14, wherein the single set of connection terminals is a single terminal.

41. A display apparatus comprising: a plurality of connection terminals to receive signals from a connection unit, the plurality of connection terminals being the same in a shape, a number of pins, and pin arrangements thereof, and the plurality of connection terminals being the only terminals disposed on the display apparatus to receive video and audio signals; a controller to determine a type of input signals which are input from an external device through the connection unit and the plurality of connection terminals; and a signal processing unit to process the input signals according to the determined type, wherein the connection unit is external to of the display apparatus and includes a cable removably connected between the connection unit and the external device, an output side of the connection unit connected to the connection terminals having a same shape as that of the connection terminals, and an input side of the connection unit having a different shape from that of the output side.

* * * * *